United States Patent Office 3,342,842
Patented Sept. 19, 1967

3,342,842
TETRA (5-NORBORNENE-2-METHYL) TITANATE
Guy J. Del Franco, Brooklyn, N.Y., assignor to Interchemical Corporation, New York, N.Y., a corporation of Ohio
No Drawing. Filed June 15, 1964, Ser. No. 375,320
1 Claim. (Cl. 260—429.5)

This invention relates to the titanium ester, tetrakis (2-hydroxymethyl-5-norbornene) titanate.

It may be conveniently prepared, for example, by reacting at room temperature 35.5 g. of tetraisopropyl titanate (0.13 mole) with 62 g. (0.65 mole) of 2-hydroxymethyl-5-norbornene and stripping off isopropanol as it is formed. The reaction is exothermic and therefore requires cooling to maintain the batch at approximately room temperature. When the reaction is complete a solid white product in good yield is isolated by filtration and washing free of 2-hydroxymethyl-5-norbornene by refluxing overnight with petroleum ether in a soxhlet extractor. The thus purified titanate has a melting point of 187–188° C. and a molecular weight of 541 (540 theoretical). Infrared analysis, elemental analysis, and iodine value also confirms the structure,

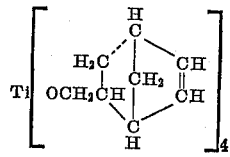

It is soluble in cyclohexane, benzene, toluene, heptane, and butanol.

Other processes may be used for making the compound, such as reacting $TiCl_4$ with 2-hydroxymethyl-5-norbornene in the presence of an acid binder.

In contrast with other titanate esters tried, the ester of the instant invention has very good stability against hydrolysis and thermal condensation. It is useful as a crosslinking agent for resins having pendant hydroxyl or carboxyl groups, for polymers containing unsaturated double bonds, for polyvinyl esters, and the like. It may be incorporated in coating compositions based on hydrocarbon resins, where even minor amounts of the order of 1–5% of the titanate impart better flexibility, resistance, and adhesion than have analogous compositions free from the titanate.

What is claimed is:
Tetra (5-norbornene-2-methyl) titanate.

References Cited
Chemical Abstracts, vol. 56 (1962) pages 5620–5621.

TOBIAS E. LEVOW, *Primary Examiner.*
H. M. S. SNEED, *Assistant Examiner.*